United States Patent
Woo et al.

(10) Patent No.: US 10,388,946 B2
(45) Date of Patent: Aug. 20, 2019

(54) ELECTRODE, METHOD FOR MANUFACTURING THE SAME, ELECTRODE MANUFACTURED BY THE METHOD, AND SECONDARY BATTERY COMPRISING THE SAME

(71) Applicant: LG CHEM, LTD., Seoul (KR)

(72) Inventors: Sun-Hwak Woo, Daejeon (KR); Young-Geun Choi, Daejeon (KR); Hye-Bin Kim, Daejeon (KR); Ji-Hye Yang, Daejeon (KR)

(73) Assignee: LG CHEM, LTD, Seoul (KR)

( * ) Notice: Subject to any disclaimer, the term of this patent is extended or adjusted under 35 U.S.C. 154(b) by 281 days.

(21) Appl. No.: 15/515,401

(22) PCT Filed: Jan. 11, 2016

(86) PCT No.: PCT/KR2016/000246
§ 371 (c)(1),
(2) Date: Mar. 29, 2017

(87) PCT Pub. No.: WO2016/111605
PCT Pub. Date: Jul. 14, 2016

(65) Prior Publication Data
US 2017/0222216 A1 Aug. 3, 2017

(30) Foreign Application Priority Data

Jan. 9, 2015 (KR) .................. 10-2015-0003623

(51) Int. Cl.
*H01M 4/36* (2006.01)
*H01M 4/04* (2006.01)
(Continued)

(52) U.S. Cl.
CPC .............. *H01M 4/362* (2013.01); *H01M 4/04* (2013.01); *H01M 4/0428* (2013.01); *H01M 4/13* (2013.01);
(Continued)

(58) Field of Classification Search
CPC ...... H01M 4/362; H01M 4/04; H01M 10/052; H01M 4/0428; H01M 4/1395;
(Continued)

(56) References Cited

U.S. PATENT DOCUMENTS 8,440,350 B1 * 5/2013 Verbrugge .......... H01M 4/0421
429/209
8,574,744 B1 * 11/2013 Teeters .................. H01L 51/441
429/122
(Continued)

FOREIGN PATENT DOCUMENTS

KR 10-1147201 B1 5/2012
KR 10-2012-0089512 A 8/2012
(Continued)

OTHER PUBLICATIONS

Chen, S., et al, "Silicon core-hollow carbon shell nanocomposites with tunable buffer voids for high capacity anodes of lithium-ion batteries," Phys.Chem.Chem.Phys., Jul. 27, 2012, vol. 14, No. 37, pp. 12741-12745.
(Continued)

*Primary Examiner* — Stewart A Fraser
(74) *Attorney, Agent, or Firm* — Birch, Stewart, Kolasch & Birch, LLP

(57) ABSTRACT

Provided is an electrode, comprising: an electrode current collector, a metal nanowire formed on a surface of the electrode current collector, and a conductive layer surrounding the outside of the metal nanowire, wherein a gap is formed between the metal nanowire and the conductive
(Continued)

layer, so that the metal nanowire and the conductive layer are spaced apart from each other without direct contact between them.

14 Claims, 3 Drawing Sheets

(51) Int. Cl.
  *H01M 4/38*  (2006.01)
  *H01M 4/62*  (2006.01)
  *H01M 4/13*  (2010.01)
  *H01M 4/66*  (2006.01)
  *H01M 4/134*  (2010.01)
  *H01M 4/1395*  (2010.01)
  *H01M 10/052*  (2010.01)
  *H01M 4/02*  (2006.01)

(52) U.S. Cl.
  CPC ......... *H01M 4/134* (2013.01); *H01M 4/1395* (2013.01); *H01M 4/38* (2013.01); *H01M 4/625* (2013.01); *H01M 4/66* (2013.01); *H01M 10/052* (2013.01); *H01M 4/386* (2013.01); *H01M 4/387* (2013.01); *H01M 2004/021* (2013.01); *H01M 2004/027* (2013.01); *Y02T 10/7011* (2013.01)

(58) Field of Classification Search
  CPC ........ H01M 4/134; H01M 4/625; H01M 4/38; H01M 4/66; H01M 4/13
  See application file for complete search history.

(56) References Cited

U.S. PATENT DOCUMENTS

| | | |
|---|---|---|
| 2011/0111227 A1 | 5/2011 | Crocker et al. |
| 2011/0195311 A1 | 8/2011 | Kim et al. |
| 2012/0094192 A1* | 4/2012 | Qu .................. B01J 13/02 429/336 |
| 2014/0302385 A1 | 10/2014 | Choi et al. |
| 2016/0032475 A1* | 2/2016 | Huyghebaert ......... C25D 1/006 174/128.1 |
| 2016/0118643 A1* | 4/2016 | Bahr .................... H01M 4/045 205/57 |
| 2017/0062834 A1* | 3/2017 | Unnikrishnan ....... H01M 4/661 |

FOREIGN PATENT DOCUMENTS

| | | |
|---|---|---|
| KR | 10-2013-0126796 A | 11/2013 |
| KR | 10-2014-0121096 A | 10/2014 |
| KR | 10-2014-0130578 A | 11/2014 |

OTHER PUBLICATIONS

Guan, C. et al, "Highly Stable and Reversible Lithium Storage in SnO2 Nanowires Surface Coated with a Uniform Hollow Shell by Atomic Layer Deposition," Nano Letters, Jul. 24, 2014, vol. 14, No. 8, pp. 4852-4858.

Seng, K.H., et al, "Self-Assembled Germanium/Carbon Nanostructures as High-Power Anode Material for the Lithium-Ion Battery," Angew. Chem. Apr. 26, 2012, vol. 124, No. 23, pp. 5755-5759.

International Search Report issued in PCT/KR2016/000246, dated Apr. 21, 2016.

Ruffo et al., "Impedance Analysis of Silicon Nanowire Lithium Ion Battery Anodes", J. Phys. Chem. C, vol. 113, No. 26, 2009, pp. 11390-11398.

Chan et al., "High Capacity Li Ion Battery Anodes Using Ge Nanowires", Nano Letters, 2008, vol. 8, No. 1, pp. 307-309.

* cited by examiner

ELECTRODE, METHOD FOR MANUFACTURING THE SAME, ELECTRODE MANUFACTURED BY THE METHOD, AND SECONDARY BATTERY COMPRISING THE SAME

TECHNICAL FIELD

The present disclosure relates to an electrode, a method for manufacturing same, an electrode manufactured by the method, and a secondary battery comprising the same, and more particularly, to an electrode having excellent life characteristics and output characteristics through structure improvement of an electrode active material, a method for manufacturing the same, an electrode manufactured by the method and a secondary battery comprising the same.

The present application claims priority to Korean Patent Application No. 10-2015-0003623 filed on Jan. 9, 2015 the disclosure of which is incorporated herein by reference.

BACKGROUND ART

Recently, there has been an increasing interest in energy storage technology. Electrochemical devices have been widely used as energy sources in the fields of cellular phones, camcorders, notebook computers, PCs and electric cars, resulting in intensive research and development into them.

In this regard, electrochemical devices are one of the subjects of great interest. Particularly, development of a rechargeable secondary batteries has been the focus of attention. Recently, research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni—MH, Ni—Cd, and $H_2SO_4$—Pb batteries.

Generally, a lithium secondary battery is prepared by using a cathode and an anode which are each made of a material capable of intercalating and disintercalating lithium ions, and filling an organic or polymer electrolyte solution between the cathode and the anode, and the battery produces electrical energy by oxidation and reduction when the lithium ions are intercalated and disintercalated in the cathode and the anode.

In lithium secondary batteries which are currently available, an anode is mostly made of carbon-based materials as an electrode active material. Particularly, graphite which has been commercially available has a real capacity of about 350 to 360 mAh/g which approaches its theoretical capacity of about 372 mAh/g. Although a carbon-based material such as graphite has a capacity of such a degree, it does not meet the demand for high-capacity lithium secondary batteries as an anode active material.

In order to meet such a demand, attempts have been made to use metals as an anode active material, for example, Si, Sn, an oxide and an alloy thereof, that have a higher charge/discharge capacity than the carbon materials and that allow electrochemical alloying with lithium. However, this metal-based electrode active material has a great change in volume during charging/discharging, which may cause cracks and micronization to the active material. Secondary batteries using this metal-based anode active material may suddenly be deteriorated in capacity and have reduced cycle life during repeated charging/discharging cycles. Accordingly, there is a need for solving the deterioration of capacity and cycle life by the use of such a metal-based electrode active material.

DISCLOSURE

Technical Problem

The present disclosure is designed to solve the problems of the related art, and therefore the present disclosure is directed to providing an electrode having improved life characteristics and output characteristics by the use of an electrode active material comprising a metal nanowire-gap-conductive layer, a method for manufacturing the same, an electrode manufactured by the method, and a secondary battery comprising the same.

These and other objects and advantages of the present disclosure may be understood from the following detailed description and will become more fully apparent from the embodiments of the present disclosure. Also, it will be easily understood that the objects and advantages of the present disclosure may be realized by the means shown in the appended claims and combinations thereof.

Technical Solution

In one aspect of the present disclosure, there is provided an electrode, comprising an electrode current collector, a metal nanowire formed on a surface of the electrode current collector, and a conductive layer surrounding the outside of the metal nanowire, wherein a gap is formed between the metal nanowire and the conductive layer, so that the metal nanowire and the conductive layer are spaced apart from each other without direct contact between them.

The metal nanowire may be a germanium nanowire.

The metal nanowire may be formed in an upper direction or in a lower direction on the surface of the electrode current collector.

The long-axis direction of the metal nanowire and the surface of the electrode current collector may form an angle of 40 to 140°.

The conductive layer may be a graphene layer.

The electrode current collector may be at least one selected from a group consisting of copper; stainless steel; aluminum; nickel; titanium; sintered carbon; stainless steel surface-treated with carbon, nickel, titan or silver; and aluminum-cadmium alloy.

In another aspect of the present disclosure, there is also provided a secondary battery comprising the electrode mentioned above.

Further, in yet another aspect of the present disclosure, there is also provided a method for manufacturing an electrode, the method comprising: depositing a metal nanowire to face towards an upper direction or a lower direction of a surface of an electrode current collector, forming a metal oxide nanowire layer by oxidizing a portion of a surface of the metal nanowire, coating a conductive layer on a surface of the metal oxide nanowire layer, and forming a gap between the metal nanowire and the conductive layer by removing the metal oxide nanowire layer.

The metal nanowire may be deposited on the surface of the electrode current collector by a chemical vapor deposition.

The metal oxide nanowire layer may be removed by being dissolved in water.

The metal nanowire may be a germanium nanowire.

The conductive layer may be a graphene layer.

The electrode current collector may be at least one selected from a group consisting of copper; stainless steel; aluminum; nickel; titanium; sintered carbon; stainless steel surface-treated with carbon, nickel, titan or silver; and aluminum-cadmium alloy.

In yet another aspect of the present disclosure, there is also provided an electrode manufactured by the method mentioned above.

Further, in yet another embodiment of the present disclosure, there is also provided a secondary battery comprising the electrode mentioned above.

Advantageous Effects

The present disclosure provides an electrode active material that simultaneously comprises a metal nanowire having excellent capacity characteristics and a carbon-based conductive layer having excellent life characteristics and electrical conductivity, thereby having an advantage of being simultaneously provided with high capacity, high output and excellent life characteristics.

Further, as it is provided with an additional gap between the metal nanowire and the conductive layer, there is an advantage of alleviating volume expansion of the electrode that occurs in a charging and discharging process.

Further, as the metal nanowire is arranged vertically on the electrode current collector, there is an advantage of relatively facilitated movement of electrons.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure should not be construed as being limited to the drawings.

BEST MODE

Figure 1:
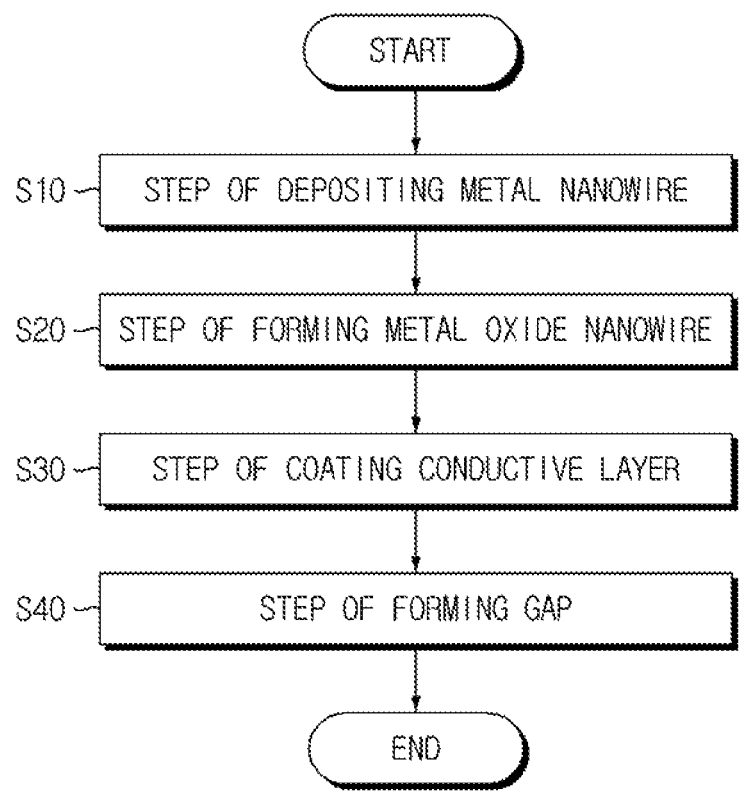
FIG. 1 is a flowchart illustrating a method for manufacturing an electrode according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments disclosed in the present specification and the configurations illustrated in the drawings are merely the most preferred embodiments of the present disclosure, and not all of them represent the technical ideas of the present disclosure, and thus it should be understood that there may be various equivalents and modified examples that could substitute therefore at the time of filing the present application.

The electrode according to an embodiment of the present disclosure comprises an electrode current collector, a metal nanowire formed on a surface of the electrode current collector, and a conductive layer surrounding the outside of the metal nanowire, and a gap may be formed between the metal nanowire and the conductive layer, so that the metal nanowire and the conductive layer are spaced apart from each other without direct contact between them.

Here, there is no limitation to the material that may be applied to the electrode current collector as long as it may be applied to a battery, and the electrode current collector that may be used is made of at least one selected from a group consisting of, for example, without limitation, copper; stainless steel; aluminum; nickel; titanium; sintered carbon; stainless steel surface-treated with carbon, nickel, titan or silver; and aluminum-cadmium alloy.

The metal nanowire is formed on the surface of the electrode current collector, more particularly, a long-axis direction of the metal nanowire is formed to protrude without being attached to the surface of the metal nanowire, and may be formed in an upper direction or a lower direction of the surface of the electrode current collector, and there is an advantage of facilitated movement of electrons in a charging and discharging process.

Here, the long-axis direction of the metal nanowire and the surface of the electrode current collector may form an angle of 40 to 140°, preferably, 80 to 100°, and more preferably, vertical.

Further, the metal that may be applied to the metal nanowire of the present disclosure may be at least one selected from a group consisting of silicon, tin, aluminum and germanium, and preferably, germanium, and since germanium has an advantage that its theoretical capacity is about 1600 mAh/g, which is a high capacity that may be up to 4 times or more than that of a carbon-based material, there is an advantage of being applicable to a high capacity apparatus.

The conductive layer surrounds the outside of the metal nanowire, and more particularly, being spaced apart from the metal nanowire by a certain distance without directly contacting the metal nanowire, it surrounds the outside of the metal nanowire such that it includes a gap therebetween. This generates free space compared to when the metal nanowire and the conductive layer contact each other, which provides an advantage where it may act as a buffer layer that alleviates volume expansion that may occur in a charging and discharging process.

Further, any material that is capable of serving as a conductive material may be applied, without limitation, to the conductive layer of the electrode according to an embodiment of the present disclosure, a preferable example being a graphene layer, and by comprising the graphene layer having high output characteristics, it is possible to improve the problem of deteriorating output due to deteriorating diffusion as in a germanium nanowire.

According to another embodiment of the present disclosure, a secondary battery comprising the aforementioned electrode is provided. Here, the electrode may be used as an anode, and the battery may further comprise a separator and a cathode.

The cathode may made of any material being used as a cathode in the related art, without limitation. Specifically, the cathode may be one that a cathode active material may be coated on a surface of a cathode current collector.

Here, non-limiting examples of the cathode current collector that may be used include those made of stainless steel; aluminum; nickel; titanium; sintered carbon; stainless steel surface-treated with carbon, nickel, titan or silver; or aluminum-cadmium alloy and the like.

Further, non-limiting examples of the cathode active material that may be applied to the present disclosure comprise those made of active material particles consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein M1 and M2 are each independently selected from a group consisting of Al, Ni, Co, Fe, Mn, V, Cr, Ti, W, Ta, Mg and Mo, and x, y and z being, independently from one another, atomic fractions of elements that constitute oxides, in which $0 \leq x<0.5$, $0 \leq y<0.5$, $0 \leq z<0.5$, $0<x+y+z \leq 1$).

The separator may be made of any material used in the related art, without limitation, if it is interposed between an anode and a cathode to short-circuit. Preferably, the separator comprises a porous polymer substrate and a porous coating layer coated on at least one surface of the porous polymer substrate.

Non-limiting examples of the porous polymer substrate include a porous polymer film made of polyolefin such as polyethylene and polypropylene, and such a polyolefin porous polymer film substrate exhibits a shutdown function at a temperature of, for example, 80 to 130° C.

Here, the polyolefin porous polymer film may be formed from a polymer obtained by mixing polyolefin polymer such as polyethylene such as high density polyethylene, linear low density polyethylene, low density polyethylene and ultra-high molecular polyethylene, polypropylene, polybutylene, and polypentene and the like, solely or in combination of two or more thereof.

Further, the porous polymer film substrate may be molded in the form of a film by using various polymers such as polyester and the like, besides polyolefin. Further, the porous polymer film substrate may be formed in a structure where two or more film layers are laminated, and each of the film layers may be formed as polymer by mixing the polymer such as the aforementioned polyolefin, polyester and the like, solely or in combination of two or more thereof.

Further, the porous polymer film substrate and porous non-woven substrate may be formed as polymer by mixing polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, polyethylenenaphthalene and the like, solely or in combination thereof, besides the aforementioned polyolefin.

Further, a thickness of the porous substrate is not particularly limited, but is preferably, 5 to 50 μm, and a size of a pore existing in the porous substrate is not limited as long as it is smaller than polymer binder fiber of an electrode adhesion layer, but is preferably, 0.001 to 50 μm, and its air porosity is preferably 1 to 99%.

Further, a porous coating layer may be further included on at least one surface of the porous polymer substrate aforementioned as the separator that may be applied to the present application, and the porous coating layer may include an inorganic particle and binder polymer.

The inorganic particles are bound to each other by the binder polymer in the state that the particles are substantially present in contact with each other to form a closest packed structure, and an interstitial volume is generated from the contact of the inorganic particles with each other and turns into empty space, thereby forming pores.

That is, the binder polymer allows the adhesion of inorganic particles so that the inorganic particles can be bound with each other, for example, the binder polymer connects and immobilizes the inorganic particles therebetween. Further, the pore of the porous coating layer is formed as the interstitial volume between the inorganic particles turned into an empty space, which is a space limited by the inorganic particles substantially surface-contacting in a closed packed or densely packed structure by the inorganic particles. Through such a pore of the porous coating layer, a path through which a lithium ion that is essential for operating the battery moves may be provided.

The inorganic particle is not particularly limited as long as it is electrochemically stable. That is, the inorganic particle that may be used in the present disclosure is not particularly limited as long as it is one that does not generate an oxidization and/or a reduction reaction in an operating voltage range (for example, 0 to 5 V with reference to $Li/Li^+$) of an electrochemical device being applied. Especially, in the case of using an inorganic particle having a high dielectricity, as the inorganic particle, it may contribute to an increase of electrolyte salt within liquid electrolyte, for example, increase of a degree of dissociation of lithium salt, thereby enhancing the ion conductivity of the electrolyte.

Due to the aforementioned reasons, the inorganic particle may comprise an inorganic particle of a high dielectricity of which the dielectric constant is 5 or above, and preferably, 10 or above, or an inorganic particle having an ability of transmitting a lithium ion, or a mixture thereof.

Non-limiting examples of the inorganic particle having a dielectric constant of 5 or above comprise any one or a mixture of two or more selected from a group consisting of $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$), hafnia($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$, and such inorganic particles not only exhibit high dielectricity characteristics of a dielectric constant of 100 or above, but also have piezoelectricity where a potential difference occurs between both surfaces when a predetermined pressure is applied for extension or compression to generate charges, and may therefore prevent internal short circuit of both electrodes being caused by external impact and enhance the stability of an electrochemical device.

Further, the inorganic particles having the ability to transport lithium ions refer to inorganic particles containing lithium atom which are capable of moving lithium ions without storing the lithium. Non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$), and a mixture thereof. The combination of the inorganic particle having a high dielectricity and the inorganic particle having the ability of transmitting a lithium ion aforementioned can provide synergetic effect being doubly increased.

The size of the inorganic particle of the porous coating layer is not limited, but for the sake of forming a coating layer with a uniform thickness and an appropriate porosity, the preferable size is within a range of 0.001 to 10 µm, if possible.

The polymer binder for forming the porous coating layer may be used without limitation as long as it is a binder that may be used to form a porous coating layer together with an inorganic particle, but preferably, it may be an organic binder polymer or an aqueous binder polymer.

FIG. 1 is a flowchart illustrating a method for manufacturing an electrode according to an embodiment of the present disclosure. Referring to FIG. 1, the method for manufacturing an electrode of the present disclosure comprises a step of depositing metal nanowire (S10), a step of forming metal oxide nanowire (S20), a step of coating a conductive layer (S30) and a step of forming a gap (S40).

In the step of depositing metal nanowire (S10), the metal nanowire is deposited such that it faces towards an upper direction or a lower direction of a surface of an electrode current collector.

Figure 2A:
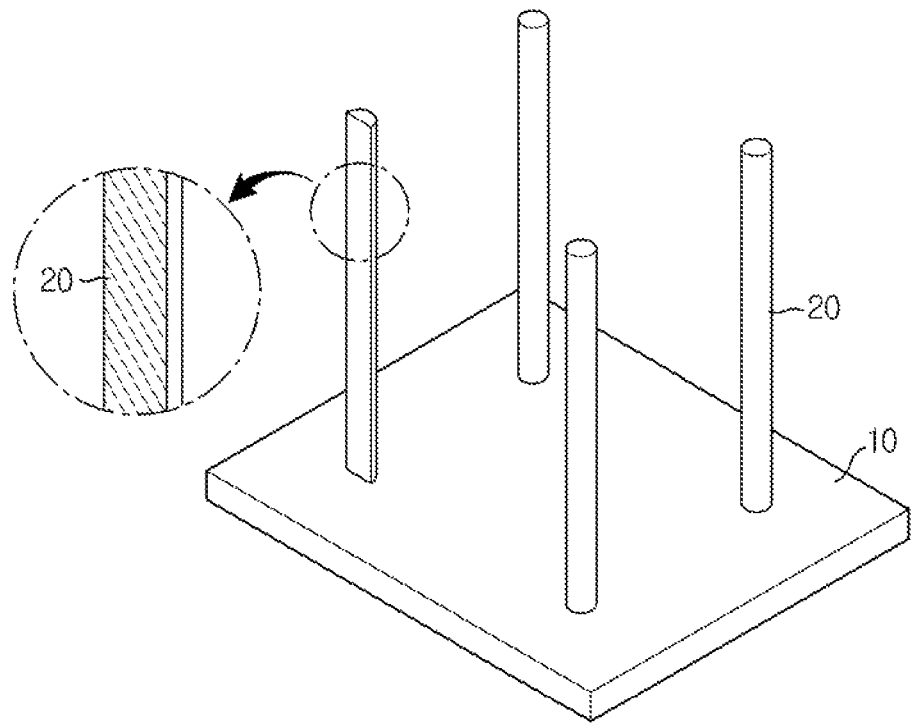
FIG. 2A is a mimetic diagram schematically illustrating a step of depositing metal nanowire.

FIG. 2A is a perspective view illustrating a state where the metal nanowire is deposited on the surface of the electrode current collector, and referring to FIG. 2A, the metal nanowire 20 is deposited in the upper direction on the surface of the electrode current collector 10 in accordance with an embodiment of the present disclosure.

The electrode current collector used in the method for manufacturing an electrode of the present disclosure may be at least one selected from a group consisting of copper; stainless steel; aluminum; nickel; titanium; sintered carbon; stainless steel surface-treated with carbon, nickel, titanium or silver; and aluminum-cadmium alloy, and preferably, stainless steel.

Further, the deposition of the metal nanowire on the surface of the electrode current collector in the present disclosure may be carried out by any method for depositing metal on a metal surface of the related art, without limitation. In a preferable embodiment, a chemical vapor deposition may be used.

Next, in the step of forming metal oxide nanowire (S20), a portion of the surface of the deposited metal nanowire is oxidized to form a metal oxide nanowire layer.

Figure 2B:
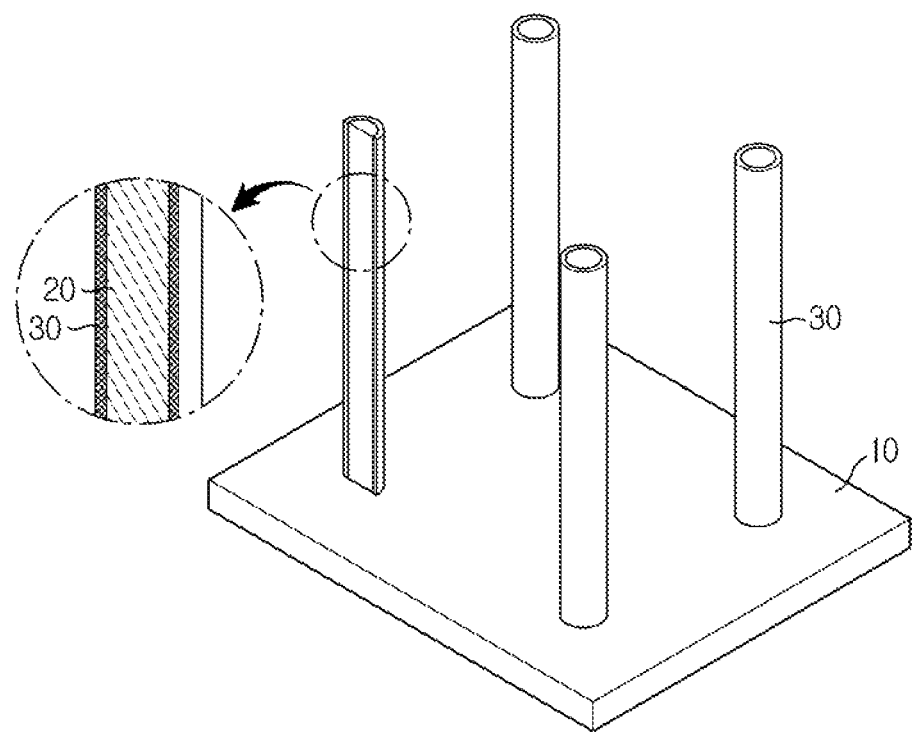
FIG. 2B is a mimetic diagram schematically illustrating a step of forming a metal oxide nanowire layer.

FIG. 2B is a perspective view illustrating a state where the metal oxide metal nanowire is formed according to an embodiment of the present disclosure, and referring to FIG. 2B, a metal oxide nanowire layer 30 is formed on a partial portion of the metal nanowire 20.

Here, the metal nanowire layer being oxidized occupies a portion of the surface in a predetermined thickness and turns into a gap later on. That is, it does not mean that the metal nanowire layer is entirely oxidized.

The oxidizing method may be varied depending on the metal of the metal nanowire being applied, and in the case of a metal that is easily oxidized in the atmosphere, the metal oxide nanowire layer may be formed by bringing the metal into being left in the atmosphere without adding an additional oxidizer.

Further, in the case of oxidization of a metal nanowire layer of which spontaneous oxidization does not proceed in the atmosphere, the metal oxide nanowire layer may be formed by conducting the oxidization reaction under an oxygen atmosphere at a high temperature.

Next, in the step of coating a conductive layer (S30), the conductive layer is coated on a surface of the metal oxide nanowire layer.

Figure 2C:
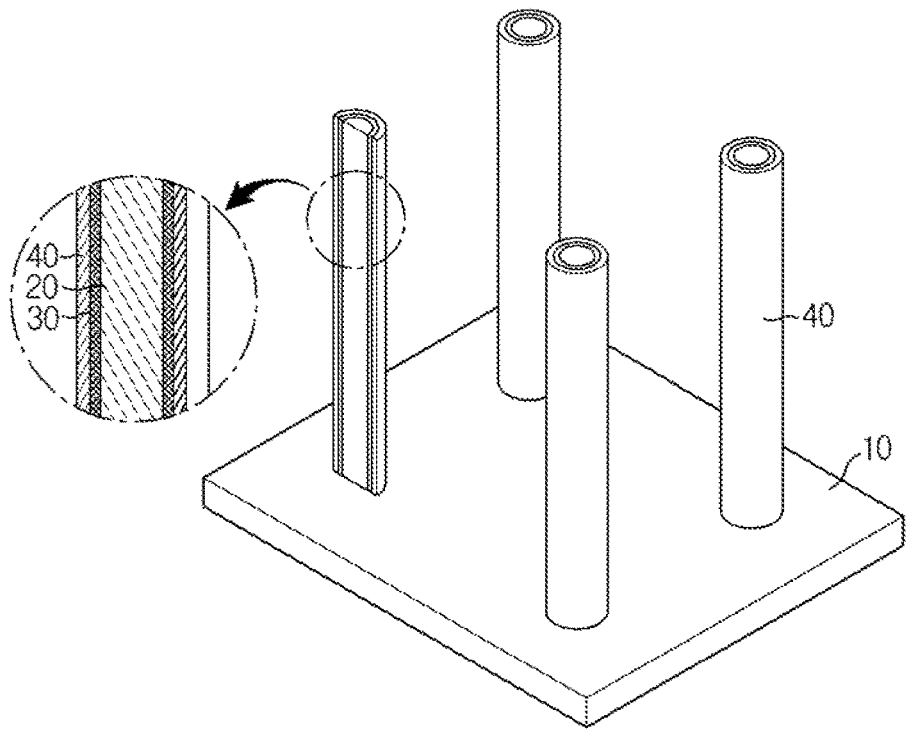
FIG. 2C is a mimetic diagram schematically illustrating a step of coating a conductive layer.

FIG. 2C is a perspective view illustrating a state where the conductive layer is coated on the surface of the metal oxide nanowire layer, and referring to FIG. 2C, by the step of coating a conductive layer (S30), the conductive layer 40 is coated on the surface of the metal oxide nanowire layer 30.

The method for coating a conductive material on the surface of the metal layer may be applied without limitation.

Especially, according to the manufacturing method of the present disclosure, since the metal oxide itself acts as a catalyst for synthesizing the conductive layer, there is no need for a heterogeneous metal catalyst such as iron, nickel and the like generally used as the catalyst for synthesizing a conductive layer, and thus there is an advantage of minimizing the effect of impurities.

Further, nitrate ($HNO_3$) and the like is generally used to dissolve the heterogeneous catalyst, but the metal oxide of the present disclosure that performs the role of a catalyst may be dissolved in water and easily removed, and thus there is an advantage of reducing chemical damages to the conductive layer.

Next, in the step of forming a gap (S40), the metal oxide nanowire manufactured at the step of forming a metal oxide nanowire (S20) is removed and the place of the removed metal oxide nanowire turns into a gap, thereby forming the metal nanowire and the conductive layer to be spaced apart from each other.

Figure 2D:
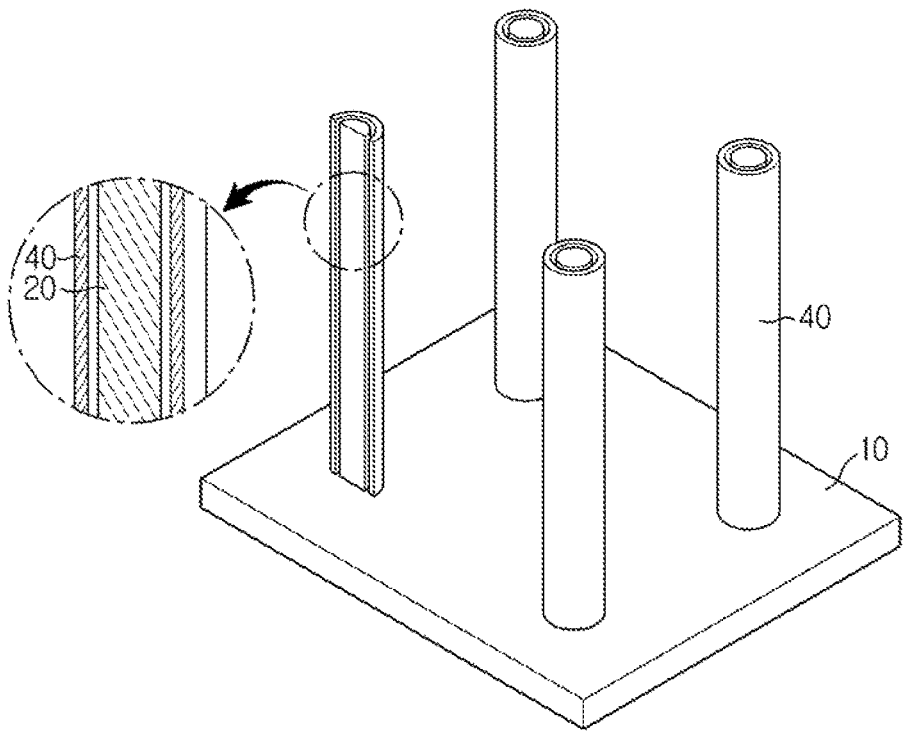
FIG. 2D is a mimetic diagram schematically illustrating a step of forming a gap between the metal nanowire and the conductive layer.

FIG. 2D is a perspective view illustrating a state where the gap is formed between the metal nanowire layer 20 and the conductive layer 40, and referring to FIG. 2D, it can be seen that as the existing metal oxide nanowire layer 30 is removed and the place generated by the removal turns into the gap.

More specifically, the metal oxide nanowire layer 30 may be manufactured by action that it is easily dissolved in water.

According to another embodiment of the present disclosure, there is also provided an electrode manufactured by the aforementioned manufacturing method and a secondary battery comprising the same.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

DESCRIPTION OF REFERENCE NUMERALS

10: ELECTRODE CURRENT COLLECTOR
20: METAL NANOWIRE LAYER
30: METAL OXIDE NANOWIRE LAYER
40: CONDUCTIVE LAYER

What is claimed is:

1. An electrode comprising:
an electrode current collector;
a metal nanowire formed on a surface of the electrode current collector; and
a conductive layer surrounding the outside of the metal nanowire,
wherein the conductive layer is a graphene layer, and
wherein a gap is formed between the metal nanowire and the conductive layer, so that the metal nanowire and the conductive layer are spaced apart from each other without direct contact between them.

2. The electrode of claim 1, wherein the metal nanowire is a germanium nanowire.

3. The electrode of claim 1, wherein the metal nanowire is formed in an upper direction or in a lower direction on the surface of the electrode current collector.

4. The electrode of claim 1, wherein the long-axis direction of the metal nanowire and the surface of the electrode current collector forms an angle of 40 to 140°.

5. The electrode of claim 1, wherein the electrode current collector is at least one selected from a group consisting of copper; stainless steel; aluminum; nickel; titanium; sintered carbon; stainless steel surface-treated with carbon, nickel, titanium or silver; and aluminum-cadmium alloy.

6. A secondary battery comprising the electrode of claim 1.

7. A method for manufacturing an electrode, the method comprising:
- depositing a metal nanowire to face towards an upper direction or a lower direction of a surface of an electrode current collector;
- forming a metal oxide nanowire layer by oxidizing a portion of a surface of the metal nanowire;
- coating a conductive layer on a surface of the metal oxide nanowire layer; and
- forming a gap between the metal nanowire and the conductive layer by removing the metal oxide nanowire layer.

8. The method of claim 7, wherein the metal nanowire is deposited on the surface of the electrode current collector by a chemical vapor deposition.

9. The method of claim 7, wherein the metal oxide nanowire layer is removed by being dissolved in water.

10. The method of claim 7, wherein the metal nanowire is a germanium nanowire.

11. The method of claim 7, wherein the conductive layer is a graphene layer.

12. The method of claim 7, wherein the electrode current collector is at least one selected from a group consisting of copper; stainless steel; aluminum; nickel; titanium; sintered carbon; stainless steel surface-treated with carbon, nickel, titanium or silver; and aluminum-cadmium alloy.

13. An electrode manufactured by the manufacturing method of claim 7, wherein the conductive layer is graphene.

14. A secondary battery comprising the electrode of claim 13.

* * * * *